J. W. GAMBLE.
FORE CARRIAGE.
APPLICATION FILED JUNE 24, 1907.
942,319.
Patented Dec. 7, 1909.
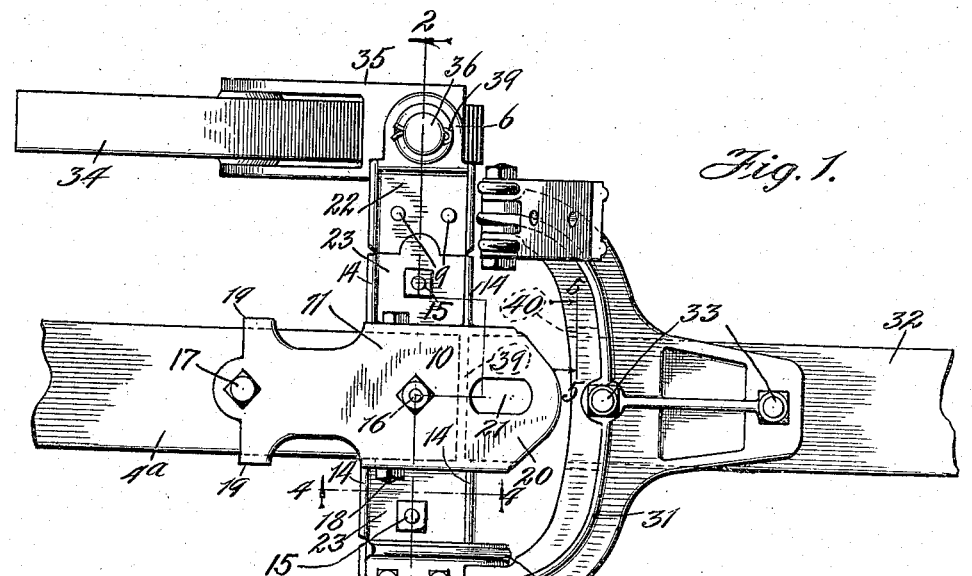

UNITED STATES PATENT OFFICE.

JOSEPH W. GAMBLE, OF CARPENTERSVILLE, ILLINOIS.

FORE-CARRIAGE.

942,319.            Specification of Letters Patent.       Patented Dec. 7, 1909.

Application filed June 24, 1907. Serial No. 380,632.

*To all whom it may concern:*

Be it known that I, JOSEPH W. GAMBLE, a citizen of the United States of America, and resident of Carpentersville, Illinois, have invented a certain new and useful Improvement in Fore-Carriages, of which the following is a specification.

My invention relates to improvements in fore-carriages for agricultural implements, vehicles, etc., and means whereby said fore-carriage is secured to the implements.

A further object is the provision of a device whereby the implement is prevented from striking the heels of the horses when the implement is turned sharply.

A further object is the provision of a device whereby a support for the vehicle is provided, thus relieving the necks of the animals from undue strain.

A further object is the production of a strong and durable device that can be readily attached to any desired implement.

These and other objects as may hereinafter appear are attained by my device, an embodiment of which is illustrated in the accompanying drawings, in which—

Figure 1 is a plan view of my device. Fig. 2 is a sectional view on line 2—2 of Fig. 1, looking in the direction indicated by the arrows. Fig. 3 is a perspective view of the strengthening plate. Fig. 4 is a sectional view on line 4—4 of Fig. 1, looking in the direction indicated by the arrows. Fig. 5 is a sectional view on line 5—5 of Fig. 1, looking in the direction indicated by the arrows, and shows a fragment of the stub tongue yoke and the flanges extending downwardly therefrom.

Like numerals of reference indicate like parts in the several figures of the drawings.

Referring now to the drawings, 4ª represents a stub tongue of an agricultural implement; 5 a horizontal connecting bar secured below the said tongue. On each end of this bar are seated journal boxes 6 provided with upper and lower inwardly extending flanges 7 and 8 having a channel between them within which the ends of the connecting bar fit, and in which it is secured in place in any desired manner, as by bolts 9. A hood 10 comprising an upper plate 11, a pair of depending sides 12, and outwardly extending flanges 13 provided with stiffening wings or braces 14, is secured to the center of the horizontal connecting bar 5. The flanges 13 are formed with a horizontally extending rectangular passage within which the connecting bar 5 fits, as shown in Fig. 4. Bolts 15 pass through the flanges and bar, rigidly securing the hood in place. The stub tongue 4ª is adapted to fit within the hood, and is secured in place by vertical bolts 16, 17, and a horizontal bolt 18 passing through the hood and tongue, the bolt 16 also passing through the connecting bar 5. The upper plate 11 of the hood is provided at its rear end with ears or flanges 19, turned downwardly, engaging the sides of the stub tongue, forming clamping members. The front end of the plate is extended forwardly at 20, and provided with an opening 21, by means of which the draft means are secured to the stub tongue.

Seated on top of the hood flanges 13 and journal box flanges 7 are securing plates 22, 23, preferably of malleable iron, the outer plate 22 having a portion cut away forming a socket 24, and the companion plate 23 having a lug or ear 25 adapted to fit within the socket 24. Brackets 26 are seated on the top of the plate 22 and over the ear 25, bolted in place by means of bolts 9 which pass through the plate 23, the journal box flange 7 and the connecting bar 5 rigidly holding the parts in place. The lugs 26 are provided with bifurcated ears 29, between which are pivoted the ends 30 of the guiding yoke 31, which is bolted to the guiding tongue 32 by means of bolts 33.

A pair of caster wheels 34 are secured to the standards 35 journaled on the shafts 36 extending through the journal boxes 6. Springs 37 surround the shaft between the journal boxes and shoulder 38. Cotter pins 39 prevent the shaft from slipping from the journal boxes, the wheels 34 are free to caster, and the bar 5 and attachments move vertically on the shaft 36. The hood is provided with inwardly projecting flanges 39 against which the end of the stub tongue abuts when pushed within the hood. The stub tongue yoke is provided with a pair of depending flanges 40, shown in dotted position in Fig. 1 and in section in Fig. 5.

It will be noted that in this device I have provided a simple and effective means for relieving the animals from all weight except the weight of the guiding tongue itself, and at the same time have provided a fore-carriage that is free to adapt itself to the inequalities of the ground, without danger of tipping, the springs 37 located between the journal boxes 6 and the circumferential flange 38 on the wheel bearing being capable of taking up the ordinary strain incident to the inequalities of the ground.

Of course, it is not expected that this carriage will adapt itself to great irregularities, but in the ordinary course of events, such irregularities are easily avoided by the driver, so the fore-carriage has only to take care of the ordinary inequalities incident to cultivated ground. The guiding bar and the parts secured thereto are so arranged as to give a maximum strength with little danger of breaking. The use of the strengthening strips 22, 23 serves as a further protection in the case of shearing of the connecting bar, as the ear 25 is secured beneath the bracket 26 and seated within the socket 24. This arrangement of parts is such as to permit a certain degree of horizontal strain without liability of breaking. The peculiar construction of the hood itself is such that the fore-carriage is readily adjustable on the stub tongue of any agricultural implement, and the parts are so arranged as to provide a strong and rigid connection therebetween. It is also so arranged as to be readily engaged or disengaged if desired, without any disarrangement of any other parts of the device.

The flange 39 on the hood serves to relieve the bolts 16 and 17 of much of their strain, as the end of the stub tongue fits closely against the inner face of the flange. The flanges 40 on the under side of the guiding yoke fit closely on the outside of the guiding tongue, and serve to hold the tongue in place against lateral movement with respect to the guiding yoke, and forms a valuable feature in my device.

It will be noted that the draft tongue is rigidly secured to the cross-bar against lateral movement, and that it, in turn, is rigidly secured to the stub tongue. When, therefore, it is desired to make an abrupt turn, the horses are turned and the implement itself swung about on the swivel wheels as pivotal points. This arrangement of parts renders it impossible for the horses to run into the end of the implement, such, for instance, as a disk harrow, and thereby running no chance of inflicting serious injury upon themselves.

I claim:

1. A fore carriage for agricultural implements having a stub tongue comprising a connecting bar, journal boxes, caster wheels free to caster on the end of said bar, said journal boxes being provided with inwardly extending flanges between which said connecting bar is secured, a flanged hood rigidly mounted on the center of said connecting bar adapted to fit over and rigidly engage the end of the stub tongue, and hold it against movement with respect to said connecting bar.

2. A fore-carriage for agricultural implements, comprising a connecting bar, a hood mounted thereon, journal boxes secured to the ends of said connecting bar, caster wheels free to caster seated in said journal boxes, a guiding tongue yoke, means secured to said connecting bar for securing said guiding tongue yoke thereto, and strengthening strips secured above said connecting bar, said strengthening strips comprising complementary plates adapted to fit together.

3. A fore-carriage for agricultural implements, comprising a connecting bar, a hood mounted thereon, journal boxes secured to the ends of said connecting bar, caster wheels free to caster seated in said journal boxes, a guiding tongue yoke, means secured to said connecting bar for securing said guiding tongue yoke thereto, and strengthening strips secured above said connecting bar, said strengthening strips comprising complementary plates one of said plates being provided with an ear adapted to fit within a recess in the complementary plate.

4. A fore-carriage for agricultural implements, comprising a connecting bar, a hood mounted thereon, journal boxes secured to the ends of said connecting bar, caster wheels free to caster seated in said journal boxes, a guiding tongue yoke, said guiding tongue yoke being provided with depending flanges for engaging the guiding tongue, means secured to said connecting bar for securing said guiding tongue yoke thereto, and strengthening strips secured above said connecting bar.

5. A fore-carriage for agricultural implements, comprising a connecting bar, caster wheels free to caster on the ends of said bar, bearing springs for said wheels, a hood mounted on the center of said connecting bar, said hood being adapted to receive and retain the stub tongue of said agricultural implement, said hood being provided with inwardly projecting flanges against which the end of said stub tongue abuts, and a guiding tongue yoke secured to the said connecting bar.

6. A fore-carriage for agricultural implements comprising a connecting bar, a hood mounted thereon, journal boxes secured to the ends of said connecting bar, caster wheels free to caster seated within said journal boxes, a guiding tongue yoke, means secured to said connecting bar for securing said guiding tongue yoke thereto, said journal boxes being provided with inwardly extending flanges between which said connecting bar is secured.

7. A fore-carriage for agricultural implements, comprising a connecting bar, a hood mounted thereon, journal boxes secured to the ends of said connecting bar, caster wheels free to caster seated in said journal boxes, a guiding tongue yoke, means secured to said connecting bar for securing said guiding tongue yoke thereto, each of said journal boxes being provided with inwardly extending flanges having a channel therebetween within which said connecting bar is secured.

8. A fore-carriage for agricultural implements, comprising a connecting bar, a hood mounted thereon, journal boxes secured to the ends of said connecting bar, caster wheels free to caster seated in said journal boxes, a guiding tongue yoke, said guiding tongue yoke being provided with depending flanges for engaging the guiding tongue, and means secured to said connecting bar for securing said guiding tongue yoke thereto, each of said journal boxes being provided with inwardly extending flanges having a channel therebetween within which said connecting bar is secured.

Signed by me at Chicago, Illinois, this 14th day of June, 1907.

JOSEPH W. GAMBLE.

Witnesses:
SARAH LEWIS,
ALBERT JOHN SAUSED.